United States Patent [19]

Maiman et al.

[11] 4,003,080
[45] Jan. 11, 1977

[54] LARGE SCREEN VIDEO DISPLAY SYSTEMS AND METHODS THEREFOR

[75] Inventors: Theodore H. Maiman, Marina del Rey; Errol G. Payne, Irvine, both of Calif.

[73] Assignee: Laser Video, Inc., Los Angeles, Calif.

[22] Filed: June 2, 1975

[21] Appl. No.: 582,653

[52] U.S. Cl. .................................. 358/63; 358/87; 358/208; 358/231
[51] Int. Cl.² ...................... H04N 9/14; H04N 3/02
[58] Field of Search ............. 178/7.3 D, 7.5 D, 7.6, 178/7.7, 7.85, 7.87; 358/60, 63

[56] References Cited

UNITED STATES PATENTS

| | | | |
|---|---|---|---|
| 3,549,800 | 12/1970 | Baker | 178/7.3 |
| 3,772,450 | 11/1973 | Babigan | 178/7.3 D |

*Primary Examiner*—Robert L. Richardson
*Attorney, Agent, or Firm*—Fraser and Bogucki

[57] ABSTRACT

A large screen display system for video modulated collimated light provides superior contrast and brightness, in a shallow depth configuration if desired. A single modulated laser beam which may have different color components is raster scanned, defining a beam envelope which is then expanded along an adequately long optical path length within a confined volume and directed toward a display screen on which the beam impinges. The optical system may selectively redirect the available light energy into a viewing volume with optical gain and with high contrast. In a particularly compact example of a rear projection system, the optical path is defined by successive reflecting elements adjacent and substantially coextensive with the screen, which cause the beam path to traverse behind the screen in successive path segments. The beam envelope is then directed obliquely against the display plane, but differentially redirected so as to be transmitted orthogonally outwardly. Optical gain may be further improved by an array of lens elements at the display plane defining diffuse point light sources to an observer, and the lens elements further may anistropically shape the far field distribution of the light. Light absorbing means disposed at the display plane can be used to enhance color contrast substantially.

31 Claims, 6 Drawing Figures

LARGE SCREEN VIDEO DISPLAY SYSTEMS AND METHODS THEREFOR

BACKGROUND OF THE INVENTION

This invention relates to systems and methods for light beam scanning and display, and more particularly to such systems and methods as applied to large screen video displays of wide bandwidth.

The patent and technical literature contain many references to TV display systems using laser beam excitation. Much of the literature is concerned with the problem of beam modulation, as in U.S. Pat. No. 3,691,484 and in an article entitled "A Televison Display Using Acoustic Deflection and Modulation of Coherent Light", by A. Korpel et al, published in APPLIED OPTICS, Vol. 5, p. 1667, October 1966. This literature discusses other factors as well, including scanning techniques, which are more comprehensively reviewed in an article entitled "Laser Display Technology", by Charles E. Baker, printed in the IEEE SPECTRUM, Vol. 5, No. 12, December 1968, pp. 39–50. The latter publication has some discussion of the numerous causes of energy attenuation in the system subsequent to the laser, reaching the conclusion that the "low efficiency of presently avilable lasers prevents any serious consideration of competing with CRT displays in the immediate future..." and that "Further application of laser display technology rests on the development of a practical, low-cost laser with an efficiency exceeding 1%".

Losses occur not only in the laser and modulating elements, such as the acousto-optical elements typically used, but also in the scanning and display portions of the system. The useful output of a system is to be measured in terms of the visual information that may be perceived by an observer. In a video or other wide bandwidth display, whether color or monochrome, the discernible information is a function of resolution and contrast as well as light intensity. In a color spot scanning system, for example, color purity, spot resolution, and the light contrast between the illuminating beam and the background can be more important than mere brightness. Despite the low efficiency of lasers it is desirable to provide displays approaching or equal to presently available television displays, in terms of derivable information, without employing large or high powered lasers. Thus maximum advantage must be taken of the energy available in the beam in terms that are useful to the viewer, in addition to minimization of attenuation. This becomes of great importance with large screen displays, because of the decrese in illumination within a given incremental area as total scan area is increased. At the same time, however, color purity and tonality must be consistent with present high standards. In order to achieve results closer to idealized color characteristics, most workers in the art have started with the assumption that it was necessary to utilize separate lasers, each generating a particular red, green or blue wavelength. Attempts have also been made to utilize the persistence and excitation characteristics of phosphors, as in U.S. Pat. Nos. 3,652,956 and 3,760,096, in order to achieve improved results. However, substantial losses occur in phosphor excitation, and both the lowered efficiency and increased complexity outweigh the benefits derived in terms of color display.

The literature also reveals that much work has been done on mechanical, electromechanical and electronic scanning systems for laser TV displays. Significant problems are encountered in the horizontal scanning motion, because of the problems involved in obtaining a scanning rate of 15,734 Hz, in accordance with U.S. standards. As described in the literature, acousto-optical scanners, fiber optic devices and various other light transmitting elements can be operated at such frequencies, but at the expense of substantial beam attenuation and some beam dispersion. While the laser is ordinarily visualized as providing a concentrated light beam, the beam actually has a meaningful cross sectional area and a Gaussian distribution of light intensity across the area. The use of many light transmissive elements can markedly decrease maximum beam intensity, increase beam area, and generate spurious beams.

Electromechanical beam scanners, such as small mirrors driven by galvanometer movements, have limitations both as to response time and linearity. Ideally, the scanned beam should move linearly with time over the display area. With a high horizontal scan rate, such as is used in a television display, significant limitations are encountered in these respects when scan angles are large. In order to illuminate a large screen display, therefore, the beam envelope must be expanded significantly along a relatively longer path length. By "large screen display" is meant a display larger than those achievable with modern direct display television sets, such as the common 25 inches diagonal cathode ray tube systems, and including typical sizes of 3 feet × 4 feet, 6 feet × 8 feet, and considerably larger areas, such as 15 feet × 20 feet displays.

It is feasible, of course, to incorporate a scanning laser in a direct projection system, with the laser projector and the screen being separated by some predetermined distance. Practically all present large screen systems, such as cathode ray tube projection systems and theater TV-type installations based on the Eidophor principle, use direct screen projection. The direct projection system is, however, often unduly cumbersome and inconvenient, and existing systems have difficulty in maintaining focus and freedom from distortion across the image area. Furthermore, a non-scanning laser beam of more than moderate energy levels can be hazardous. It is far preferable for most applications to have a single large screen display structure of shallow depth, and especially for laser systems to maintain the entire beam path within a closed structure. Typically, the depth dimension should be less than the transverse dimension of the display face. For aesthetic and installation purposes, it will often be preferred that the depth dimension be as small as possible, and a fraction of the dimensions of the display.

The large screen video display merely represents one example of a wide bandwidth display system for which a need exists. The principles and practical exemplifications of a large screen laser generated display of high useful display information output can be employed in monochromatic displays, lower bandwidth systems and specialized systems. They can be applied to visual displays of all kinds in which electron beams have traditionally been employed to generate images, especially conventional closed circuit displays such as are used with data processor and communications systems. The uses may be extended to thermograms, fluoroscopy and other contexts involving pseudocolor (conversion of intensity differences in parts of a transmitted image to differences in color). Such displays should be achievable with presently available lasers, and particularly with lasers that are economically realistic for a given use. That is, neither the initial cost nor the power requirements of the laser should be excessive, in terms of the particular domestic or industrial application for which it is being employed.

SUMMARY OF THE INVENTION

Systems and methods in accordance with the invention scan a single narrow light beam across large area display means with substantial variations in throw distances and impingement angles and redirect the incident light energy toward a viewing volume as diffuse point light sources. The scanning beam is presented against a high contrast background and with little beam attenuation. Compact, self-contained systems are provided by disposing the light source and scanning system adjacent a rear projection screen, and by expanding the scanning beam envelope by a reflecting, folded optical path system substantially coextensive with the screen. The beam traverses in successive path segments lying at small angles relative to the plane of the screen until finally being directed against the screen. The impinging beam is differentially redirected across the screen area, as by a Fresnel lens or segment of a Fresnel lens to be transmitted outwardly with substantial orthogonality to the screen. In a particularly compact system, the central axis of the beam envelope is directed toward the screen at a relatively small included angle. Image distortion inherent in this configuration is compensated by electronic or optical means, such as a selectively curved mirror along the beam path.

In a specific example of a system in accordance with the invention, a laser providing at least three different wavelengths, constituting the color components for a color display, is disposed behind and adjacent to a rear projection screen. The finely defined and collimated laser beam, with the individual wavelength components in superposition, is initially directed substantially parallel to the plane of the screen. A single modulator in the beam path separately modulates the three different wavelengths while maintaining the collinear relationship. Scanning elements also disposed adjacent the rear projection screen direct the scanning beam into a folded optics system, comprising two or more reflectors disposed coextensive with the area defined by the outer margin of the screen. A Fresnel lens or Fresnel lens segment substantially coextensive with the screen area and centered on the focal point of the beam envelope differentially redirects the beam into a viewing volume which is substantially normal to the screen. The picture is held in focus thoughout, even with a small angle between the beam envelope and the plane of the screen. The collinear color components of the beam preserve color registration as well as beam resolution, and the single modulator and optical elements are so employed as to avoid color dispersion. The picture is suitably free of disturbing distortion despite the fact that more than a 6:1 ratio may exist between the picture diagonal and system depth.

Another feature of systems in accordance with the invention is the employment, at the display area, of an array of lens elements distributed across the display area and focusing an impinging beam light into point sources. Preferably, the lens elements are disposed in a dark background, providing high contrast and therefore picture enhancement. In addition, the lens elements may advantageously provide an anisotropic far field radiation pattern in which the horizontal included angle is substantially greater than the vertical. With or without the lens elements, image contrast may alternatively be enhanced by the use of an optical light absorber at the viewing surface, providing high transmissivity for the selected wavelength components of the light source but substantially absorbing ambient light.

DETAILED DESCRIPTION OF THE INVENTION

Figure 1:
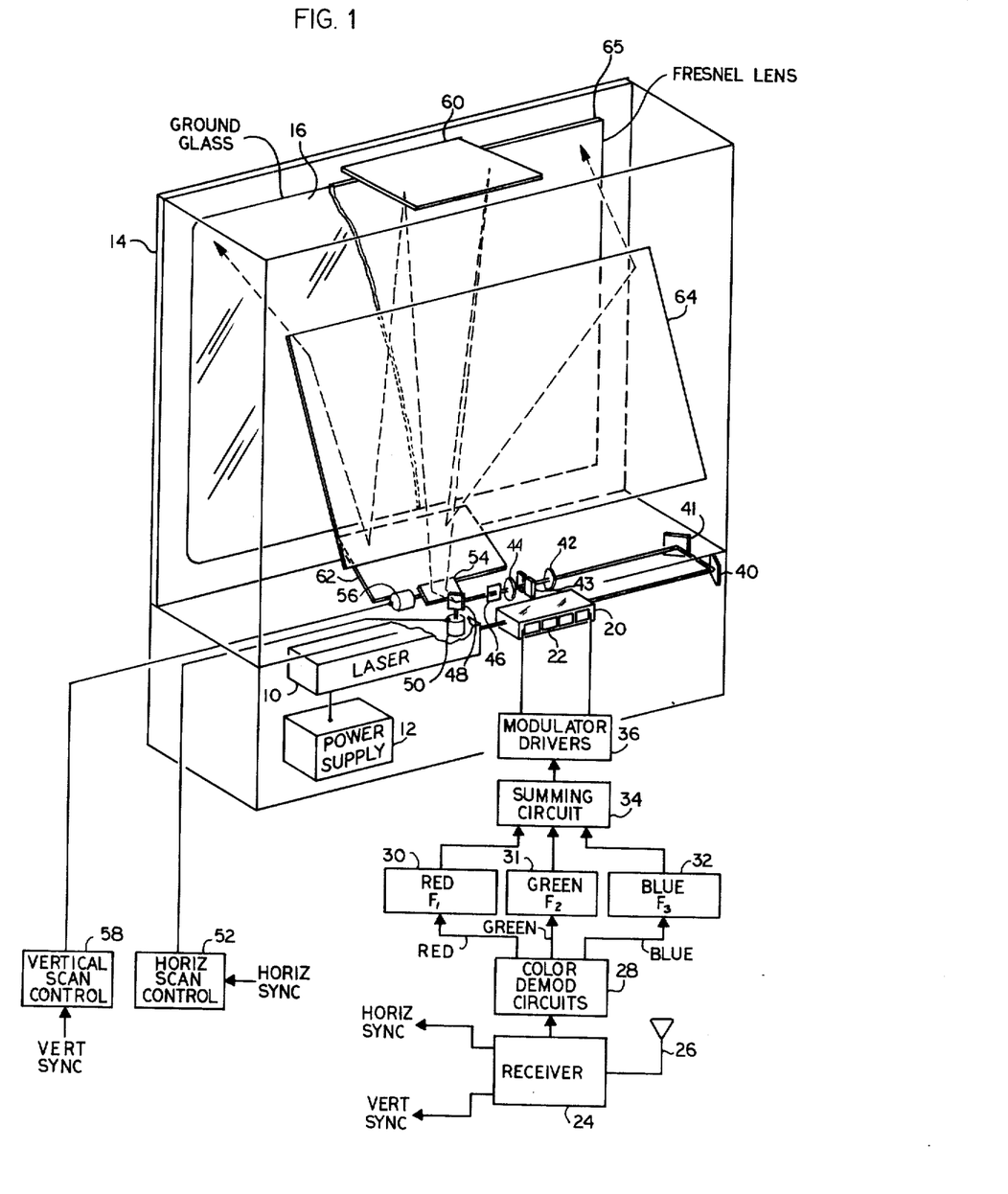
FIG. 1 is a combined block diagram and broken away perspective of a laser display system in accordance with the invention.

FIG. 1 illustrates application of systems and methods in accordance with the invention to a large flat screen, shallow depth, video display, specifically a color TV display. The entire system, including the laser 10 and power supply 12, may be disposed within a relatively shallow depth housing 14 having a ground glass or other rear projection type of display screen 16. In this Figure, some of the electronics are shown in block diagram form external to the housing for simplicity and clarity, but it will be appreciated that these units are typically entirely contained within the housing 16 unless some other disposition is desired. It is to be understood that the system is viewed in FIG. 1 from the rear, and that the useful viewing volume is in front of the display screen 16. It is further assumed that, as in the typical display installation, most observers will be disposed within a wider horizontal angle than vertical angle relative to the display screen.

The laser 10 may be any gas or solid state laser generating suitable wavelength for achieving a desired chromaticity distribution. The power required or desired for a particular application is dictated both by economic considerations and by desired display intensity. In one example of a practical system, the display screen was approximately 3 feet by 4 feet and the laser employed was a 1 watt output Spectraphysics Model 165 krypton laser having primary color components at 6471 A and 5208 A for the red and green components respectively, and a pair of blue components at 4762 A and 4825 A. The spectral distribution of this color combination has been found to provide generally more pleasing tones than many conventional color displays. Other wavelength combinations based upon different chromaticity distributions, or stemming from different laser characteristics may of course be employed in accordance with the invention.

In this example of a relatively shallow flat screen display system the laser is disposed to provide its single multi-wavelength beam along a transverse axis intitially substantially parallel to the plane of the display screen 16. The beam from the laser 10 is a finely defined single beam having different wavelength components in superposed concentric relation. The laser beam first impinges upon a modulator element 20, which may comprise an acousto-optical element having a variable index of refraction controlled by a side mounted transducer 22, which typically comprises a set of elements connected in series. To excite the transducer 22 so as to modulate each of the different wavelengths concurrently, wideband video signals such as color component signals from a television signal source are utilized. The color television signal source may comprise a camera system, a magnetic recorder-reproducer system, or a conventional receiver 24 coupled to an antenna 26 as shown. These are merely illustrations of a wideband signal system providing video (here color modulated) signals but other video signals for monochromatic or polychromatic displays may be used, including two color, four color and narrow band systems. The color demodulator circuits 28 of the receiver are shown separately only for convenience in understanding the generator of the red, green and blue color video components used in the system. Each of these signals is applied to a separate red, green or blue signal modulator 30, 31, 32, respectively. Each of the modulators 30, 31, 32 modulates a different carrier frequency designated $f_1, f_2$ and $f_3$ respectively, to provide an amplitude modulated output signal at the selected carrier frequency. The three carriers are appropriately selected and spaced relative to each other and the optical wavelengths, in accordance with considerations set out in greater detail in a pending application for patent of Theodore H. Maiman, Ser. No. 484,551, filed July 1, 1974, assigned to the assignee of the present invention. As described therein, factors such as frequency separation and modulator interaction length may advantageously be utilized to achieve high efficiency transmission (i.e., in excess of 50% transmission efficiency). The modulated signals are combined in a summing circuit 34 and applied to modulator drivers 36 coupled to the transducer 22 at the modulator element 20. The referenced application fully describes the manner and relationships by which a high proportion of the energy in the incident laser beam is properly color modulated to provide an output beam having individually modulated wavelength components, with spurious beams resulting from cross-modulation components being minimized and with crosstalk effects being held to low levels. The three modulated wavelength components, in superposed collinear and concentric relationship, define the beam which is to be scanned to provide the video picture. Reference may be made to such prior filed application and a more detailed repetition of the discussion is not necessary here.

The transmitted beam from the modulator element 20 may be passed through a spatial filter, as also described in the referenced application. In the present instance, the transmitted beam remains substantially parallel to the plane of the display screen 16, until being reflected off a pair of 45° angled mirrors 40, 41 to be returned in a direction substantially opposite but parallel to the original beam path. In the return direction the beam passes through a spatial filter comprising a focusing lens 42, a pair of knife edge elements 43 and a collimating lens 44. The beam is confined with a limited depth dimension, below the display screen 16 in this instance, and enters the optical scanning system off a slightly angled mirror 46. Horizontal line scanning is effected by a first scanning mirror 48 deflected by a vibrating mechanism 50 energized by signals from a horizontal scan control 52. In the present example, the horizontal scan control 52 receives the horizontal synchronizing signals from the receiver 24. The horizontal scan control 52 may of course simply comprise an amplifier for energizing the vibrating mechanism 50 in accordance with the sweep signal. Because of the problems involved in achieving linearity and sufficiently fast flyback time, however, the horizontal scan control 52 may include precompensating circuits of conventional types (not shown) for achieving scan linearization during the sweep movement, and energy storage circuits for accelerating the return portion of the movement. The horizontally scanned beam from the first scanning mirror 48 is directed thereafter to a second scanning mirror 54 which scans vertically at a controlled rate, under control of a galvanometer movement 56, in response to signals derived from the vertical scan control 58. The vertical sync signals are utilized to initiate a scanning motion of the second mirror 54, followed by a rapid return to the start position for the next scan, as in known systems. Scanning mirror devices are relatively simple and reliable, but provide merely examples of scanning systems that may be utilized in systems in accordance with the invention. For the high speed horizontal line scan in a conventional television picture, rotating prisms, electro-optical scanners and special reflective or refractive optical devices may be employed, although where refractive elements are utilized care must be taken to insure that they have an achromatic characteristic or are used in a fashion to provide freedom from color separation.

In one practical example of the depicted system, the vertical scan angle was approximately 10° for an approximately 23 inch system depth and a 3 feet by 4 feet screen with the optical path shown. An image expanding telescope element (not shown) may be disposed in the path of the scanning beam to enlarge the beam angle in conventional fashion if desired.

The position of the second scanning mirror 54 relative to the horizontal is such that the relatively narrow beam envelope is directed upwardly toward a first mirror 60 disposed adjacent the top of the interior of the housing 14 and close to the display screen 16. The beam direction from the second scanning mirror 54 to the first mirror 60 is only slightly off parallel relative to the plane of the viewing screen 16, and this path length is somewhat longer than the vertical dimension of the screen 16, but entirely within the volume defined by the perimeter of the housing 14. The expanding beam envelope is then directed downwardly from the first mirror 60 toward a second mirror 62 disposed below the bottom level of the display screen 16 and redirecting the beam path upwardly and rearwardly toward a forwardly tilted, rearwardly disposed third mirror 64. The scanning beam directed off the planar surface of the third mirror 64 is caused to impinge on a planar Fresnel lens 65 adjacent the display screen 16. The Fresnel lens 65 is optically cenetered on the focal point of the scanning beam envelope and differentially redirects the impinging beam at any incremental region into substantially orthogonality to the display screen 16 plane throughout its area. Although the central axis of the beam envelope is substantially normal to the plane of the display screen in the final path segment, the impingement angles and throw distances of the beam vary widely.

Figures 2, 5:
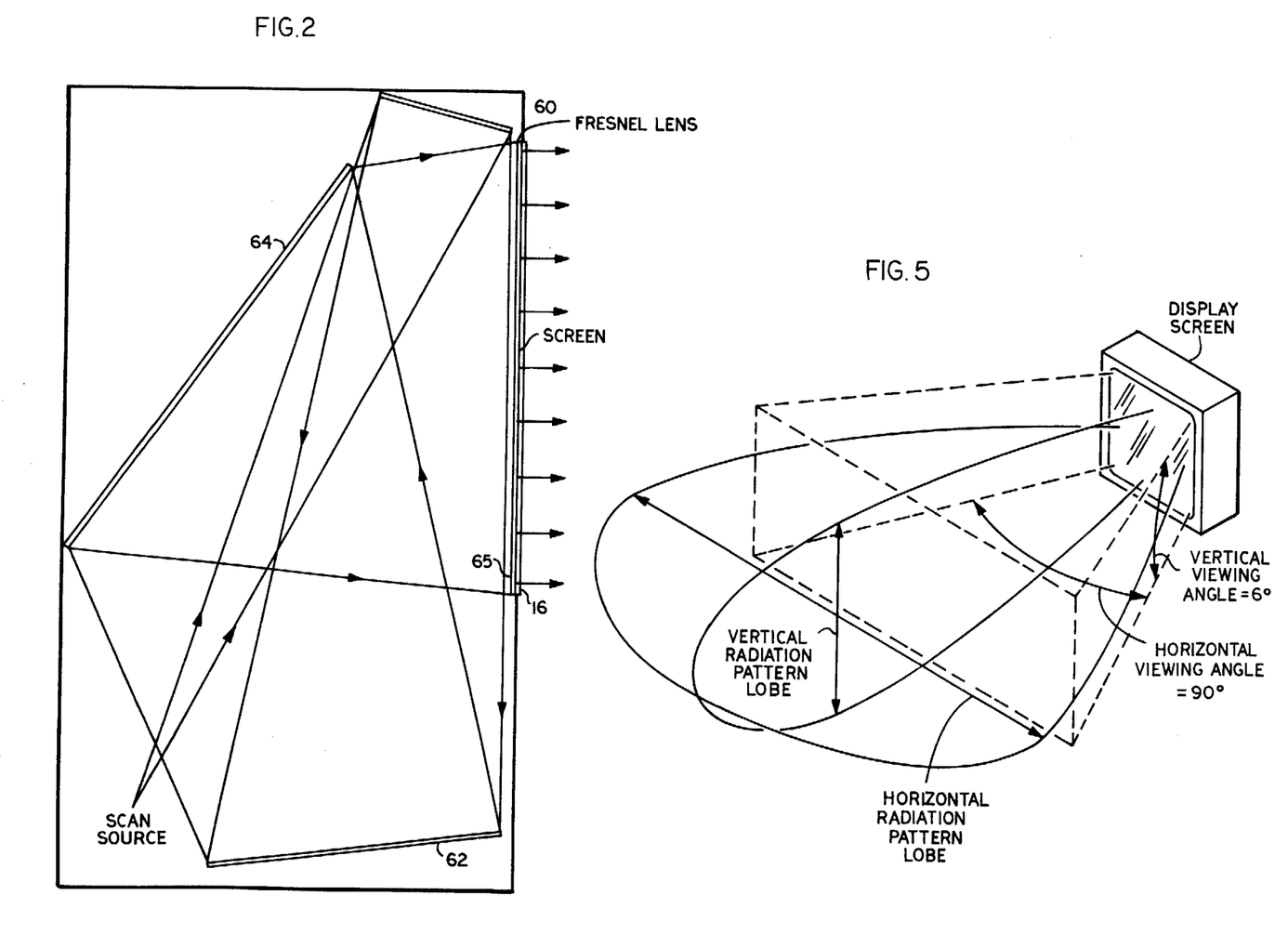
FIG. 2 is a simplified side view of the display portion of the system of FIG. 1.
FIG. 5 is an idealized representation of the far field distribution pattern in the system of FIGS. 3 and 4.

These relationships are seen more clearly in FIG. 2, in which the folding of successive reflective paths within the volume of the housing 14 is shown in side view. The scanning line source directs the approximately 10° wide beam toward the first mirror 60, which is disposed at an angle of approximately 88° relative to the mid-arc radius of the scan, and at an angle of substantially 70° with respect to the display screen 16. The expanding beam is then directed downwardly towards the second mirror 62, which lies at an approximately 25° angle with respect to the first mirror 60 and at an approximately 85° angle with respect to the display screen 16. The expanded beam envelope diverges outwardly and rearwardly toward the third mirror 64, which is approximately coextensive horizontally with the display screen 16, and at an angle of approximately 50° relative to the second mirror 62, and at 40° with respect to the display screen 16. Finally, the beam directed toward the display screen 16 is differentially refracted by the Fresnel lens 65 to impinge on the screen 16, at an approximately orthogonal angle. Although an observer sees the total display image, the instantaneous appearance of the scanning light source is a diffuse point light source. In this arrangement the depth dimension of the housing is slightly less than one half the diagonal dimension of the display screen.

Although the display screen 16 is flat and has a large area and although the throw distances along the beam path length vary substantially even in this orthogonal version across the picture area, the picture is in focus thoughout because the optical system has great depth of field. Optical or electronic means may be utilized as described in greater detail below to correct for picture distortion if desired. By thus modulating and directing the beam with low losses and selectively redirecting the beam, useful light energy in the beam is most effectively converted to visually perceptible data.

Figures 3, 4, 6:
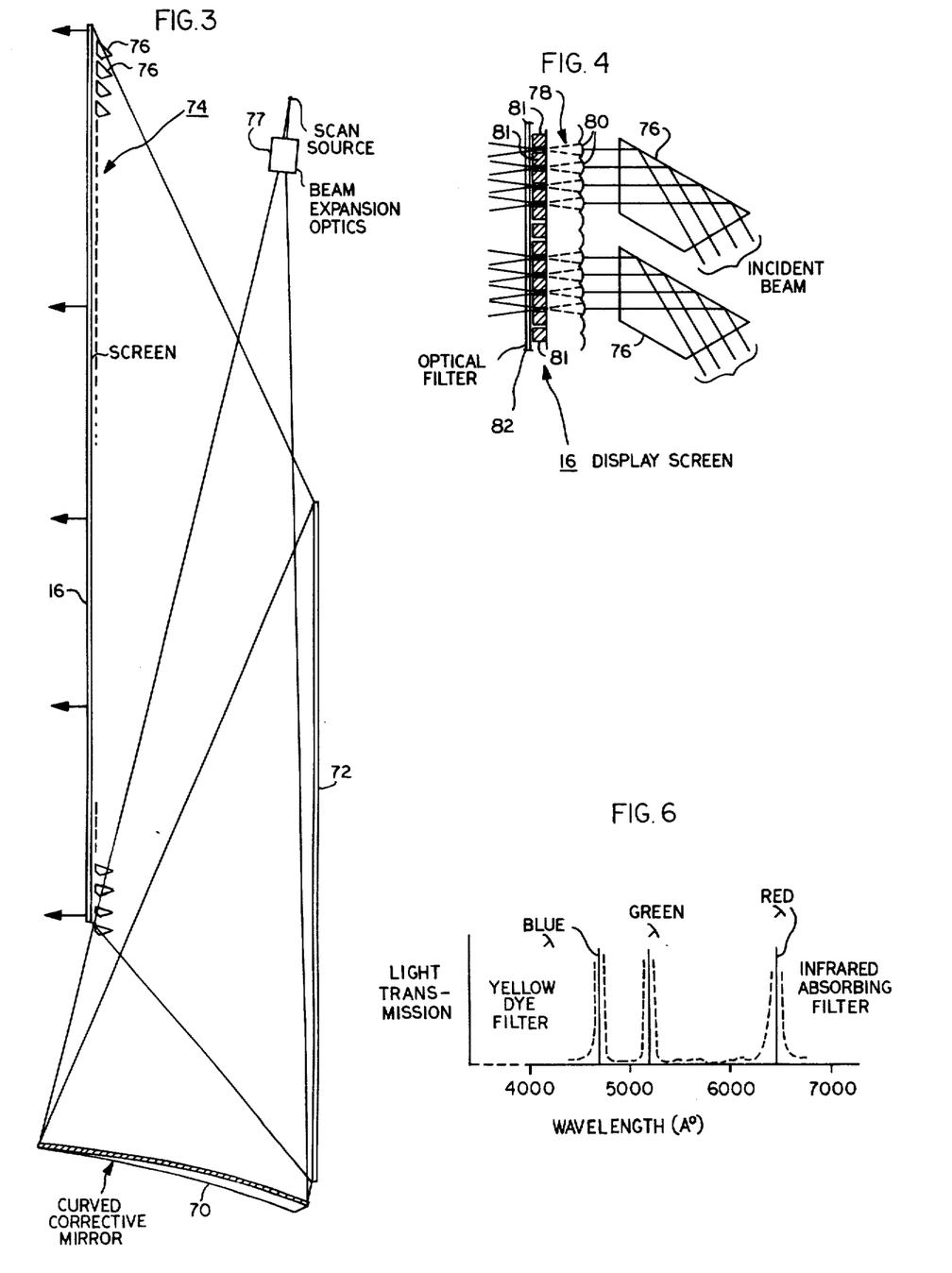
FIG. 3 is a schematic diagram of an alternative optical folding arrangement in accordance with the invention.
FIG. 4 is an enlarged fragmentary view of a portion of the display system of FIG. 3, showing details of a correction plate and lenticular screen that may be employed therein.
FIG. 6 is a diagrammatic representation of the wavelength and absorption characteristics of an optical absorber used in systems in accordance with the invention.

A substantially more shallow folded optics system is shown in FIG. 3, to which reference is now made. In this arrangement, only first and second mirrors 70, 72 are utilized in expanding the beam to the desired display area size, but the beam is directed obliquely toward the display screen 16. The vertical arc described by the scanning beam is approximately 13°. The first mirror 70 is disposed at an approximately 75° angle relative to the display screen 16, and at an approximately 83° angle relative to the mid-arc radius of the beam from the scanning means. Preferably the first mirror 70 is a curved corrective mirror shaped with greater curvature at the short path length regions. In this example the first mirror 70 is convexly curved in the rear and side portions relative to the display plane. The second mirror 72 is disposed substantially parallel to the display screen and below it, thus being at an approximate 75° angle relative to the first mirror 70. With the scan source disposed behind and near the top of the viewing screen 16, the central beam path within the beam envelope is first directed almost parallel to the display screen 16 plane in a downward direction, off the first mirror 70 and then upwardly toward the second mirror 72. The included angle between the path of the upper portion of the beam envelope deflected off the second mirror 72 and the plane of the screen 16 is less than approximately 30°.

The asymmetrical, non-orthogonal type of folded optic system shown in FIG. 3 optimizes compactness by permitting a long optical distance to be compressed into a relatively small physical space. Achromatic beam expansion optics 77 are disposed in the initial region of the beam path to enlarge the scan angle. This arrangement and variations thereof make possible laser-based displays having a diagonal to depth ratio of 6:1 and greater. Thus in a 3 feet × 4 feet display, having a 5 feet diagonal, the depth is approximately 10 inches. Non-orthogonal projection of the beam against the screen does not defocus any substantial part of the picture, because of the virtual independence of the focus from substantial differences in throw distance. The throw distance variation, however, does introduce a "keystone" effect into the picture, which is cancelled in the present example by curvature of the first mirror 70. The convex curvature of portions of this mirror 70 diverges the beam envelope in these regions to compensate for short path lengths. An even smaller angle between the beam and the display plane may be used if desired, to perhaps 20°. At this angle the impinging spot is substantially oval in shape with approximately a 3:1 height to width ratio, in comparison to a 2:1 ratio for the stated 30° angle. In both instances there is little discernible effect on resolution at the smaller angle (i.e. upper) regions of the display, but a further reduction of angle would cause discernible loss of resolution. The beam size at the screen for a 3 feet × 4 feet display was approximately 1 millimeter in this example.

Alternatively, the scan source may be disposed along a side margin of the display screen 16, and the included angle between the impinging beam and the plane of the display screen 16 may be in a horizontal plane. Compensation in this direction is more easily realized than in the instance of the vertical keystone effect.

Those skilled in the art will recognize, however, that the arrangements depicted in FIGS. 1–3 are exemplary only, and are characterized by the successive reflective folding of beam path segments that tend toward parallelism with the plane of the display screen 16 until the final path segment is directed toward the screen. Other angular configurations of two or more mirrors, resulting in non-orthogonal, non-symmetrical light direction with respect to the viewing screen may, of course, be employed in accordance with the invention. Although it is convenient to incorporate curved compensating mirrors to correct for scan distortions, it is also feasible to accomplish the same results by electronic or electro-mechanical correction in the signal processing or scanning systems.

Further aspects of systems in accordance with the invention aid in presentation of display light energy in a fashion that maximizes perceptibility of information content. One such arrangement comprises a correction plate 74 disposed adjacent the display screen 16 in FIG. 3, and utilized to correct the non-orthogonality of the incident beam envelope with respect to the display screen 16. The corrector plate 74 again comprises a Fresnel lens segment, substantially centered relative to the focal point of the final scanning beam envelope directed from the second mirror 72 onto the display screen 16. As best seen in FIG. 4, the plate 74 comprises an array of linear and parallel prismatic elements 76 (shown greatly enlarged) of triangular section and long length aligned to direct incident light substantially orthogonally against the display screen 16. The elements 76 operate upon incident light by total internal reflection or by refraction, depending upon the specific refractive index and angle of incidence of the impinging light laser beam. Surfaces of the elements 76 may be coated for better reflection if desired. Alternatively, reflective surfaces in a venetian blind configuration may be employed to orthogonalize the light with respect to the display screen 16. The correction plate 74 may be used alone, and there may be a gradation of angle along the prismatic elements 76 to improve parallelism of the redirected beam.

In the arrangement of FIG. 4, the beam impinging upon the prismatic elements 76 is asymmetrical, being longer in the vertical display direction than the horizontal due to the incidence angle. This asymmetry is retained after deflection to the screen 16, but is acceptable because the widened scanning spot merely serves to tend to fill the interior space between adjacent horizontal lines.

As also shown in FIG. 4, a bright mosaic pattern of the scanning spot against a black or high contrast background can further be used to provide superior contrast, display brightness and optical gain, so as to enhance the perceptible information content in the display. A lenticular screen 78 is employed in which lenses 80 are disposed adjacent the screen 78 on the incidence side, that is the side upon which the image beam impinges. The lenses 80 focus the image beam into an array of point illumination sources disposed within a light absorptive black background 81 on the viewing side of the screen 16. Because of the substantially parallel nature of the laser emitted light, the lenses 80 focus the incident beams very sharply and, essentially, at pinholes. Thus, with the absorptive background, contrast is very favorable and the finely defined scanning spot gives a display of enhanced perceptibility. Also there is a screen gain having a factor of between 8 to 12 or above. Embossed plastic lenses are commercially available that have suitable lens sizes, spacings and focal lengths for this purpose. The incident laser beam, at the lenticular screen 78, encompasses more than one lens 80 in the vertical direction, preferably three or more, to avoid loss of resolution.

For most applications of systems in accordance with the invention, in which it is desired to have maximum display intensity, the lenses 80 comprise anamorphic lens elements for producing large gain without substantial loss of horizontal viewing angle, but limiting the vertical viewing angle. Gains as high as 25 or more may be obtained with the use of such lenses. In a specific case, for example, a horizontal viewing angle of 90° and a vertical viewing angle of 6° produced a gain of approximately 25. This application is particularly appropriate for display uses such as teleconferences where the viewers can be situated at substantially the same vertical level as the display screen. In such event, the display screen and folded optic system provide a far field radiation pattern of the transmitted beam energy that is in a predetermined configuration adapted to the specific desired viewing volume for the application. Such a pattern is illustrated in idealized form in FIG. 5, the vertical dimension of the composite radiation pattern lobe being substantially smaller than the horizontal pattern. By taking advantage of the fact that in most uses of a video display the viewers will be within a restricted area vertically, but within a much wider viewing angle horizontally, the incident energy is more efficiently utilized.

Alternatively or additionally, the display screen 16 may be coated or covered with material absorptive at wavelengths other than the very narrow band color wavelengths emitted by the laser 10. As illustrated in FIG. 4, an optical absorber 82 having specific light transmissivity characteristics is disposed in front of the display screen 16. A suitable optical material having high transmissivities (in excess of 70%) for each of the selected wavelengths and relatively high absorption for bands between the wavelengths acts as a non-reflecting element for ambient light. Didymium glass of a type used for filtering sodium light sources is a suitable approximation. Variations of these glasses have particularly good characteristics for the present purpose. The screen 16 thus appears black or substantially dark and provides a display of high contrast between the absorptive background and the selected wavelengths in the scanning spot. Radiation below approximately 4700 A wavelength and radiation above approximately 6500 A may be absorbed by yellow dyes and infrared absorbing material, respectively. The net effect on light transmission is shown in graphical form in FIG. 6, in which the specific wavelengths in the video display are transmitted without significant attenuation while other wavelengths are substantially attenuated.

While there have been described above and illustrated in the drawings various modifications and variations in accordance with the invention, it will be appreciated that the invention is not limited thereto but encompasses all forms and deviations falling within the scope of the appended claims.

What is claimed is:

1. A large area, flat screen, display system for video signal information comprising:
    large area, flat, rear projection screen means;
    means disposed adjacent said screen means for generating a small diameter, collimated beam of light;
    beam modulating means disposed in the path of the beam for modulating the beam in response to video signals while maintaining the beam diameter and collimation;
    beam scanning means positioned adjacent said screen means and in the path of said beam subsequent to the beam modulating means for scanning said beam through a display raster within an expanding beam envelope; and
    optical path folding means comprising spaced apart reflecting elements mounted rearwardly of and adjacent to said screen means and positioned to establish a path for the expanding beam envelope that traverses behind said screen means in at least two path segments, the final path segment directing the beam against said projection screen means with substantially varying angles and throw distances within the envelope.

2. The invention as set forth in claim 1 above, including lens means disposed in the path of the beam envelope and adjacent the projection screen means for differentially redirecting the beam in accordance with its instantaneous raster position such that the beam impinges substantially orthogonally against the screen means throughout the area of the beam envelope.

3. The invention as set forth in claim 2 above, wherein said means for differentially redirecting the beam comprises a segment of a Fresnel lens optically centered with respect to the beam envelope focal point for the final path segment.

4. The invention as set forth in claim 1 above, wherein said optical path folding means is disposed to direct the final path segment obliquely toward said screen means with an included angle between the upper path of the beam envelope and the plane of the projection screen means of less than approximately 30°.

5. The invention as set forth in claim 4 above, wherein said display system further comprises beam envelope compensation means within said optical path folding means for correcting distortions in the display introduced by said folding means.

6. The invention as set forth in claim 5 above, wherein said beam envelope compensation means comprises a selectively curved reflecting element within the reflecting elements in said optical path folding means, said curved reflecting element having convex curvature in correspondence to regions of shortest path length.

7. The invention as set forth in claim 4 above, wherein said beam scanning means generates a TV raster, and wherein the diagonal dimension of said screen means relative to the depth dimension of said display is approximately 6:1 or greater.

8. The invention as set forth in claim 1 above, wherein said means for generating a beam comprises a laser providing a concentric small diameter beam having at least two superposed wavelength components, wherein said beam modulating means comprises a single acousto-optical modulator, and wherein said beam scanning means comprises mechanically driven reflective means.

9. The invention as set forth in claim 1 above, wherein the laser is positioned to direct its beam substantially parallel to the plane of and proximate one side of the projection screen means, said optical path folding means comprises at least two substantially planar reflecting elements and the initial path segments of the expanding beam envelope are at relatively small angles of inclination relative to the plane of the projection screen means.

10. The invention as set forth in claim 9 above, wherein said screen means includes a housing defining a substantially rectangular outer periphery and wherein said reflecting elements are disposed within said housing.

11. A compact system for producing a high contrast large area visual display from a modulated laser beam comprising:
scanning means for scanning the modulated laser beam through a display raster;
optical path folding means disposed in the path of the scanning beam for providing a relatively long optical path for the beam within a confined volume; and
areal display means adjacent the confined volume and substantially coextensive therewith for projecting the image defined by the display raster, the display means being disposed in the path of the focused beam adjacent the optical path folding means, said display including optical gain means.

12. The invention as set forth in claim 11, wherein said display means comprises a substantially flat viewing surface and the optical gain means comprises lens means disposed adjacent said viewing surface for focusing impinging light from the scanning beam into an array of spatially distributed light sources providing light that is directed substantially orthogonal relative to said viewing surface.

13. The invention as set fourth in claim 12, wherein said lens means have anisotropic optical properties such that they transmit display light within a limited vertical viewing angle relative to the horizontal viewing angle.

14. The invention as set forth in claim 13 above, wherein said light beam has a predetermined cross-sectional dimension and said lens elements have a cross-sectional dimension that is approximately ⅓ or less said predetermined dimension, and wherein said horizontal viewing angle is approximately 90° and said vertical viewing angle is approximately 6°.

15. The invention as set forth in claim 12 above, wherein said lens means comprises a plurality of prismatic elements and said display means comprises a spaced apart flat rear projection display screen member, said prismatic elements being disposed in a plane substantially parallel to said screen member and redirecting the scanning beam to be orthogonal to said screen member in at least one direction.

16. The invention as set forth in claim 15 above, wherein said scanning light beam scans successive parallel lines and said prismatic elements are elongated substantially parallel elements disposed in a direction parallel to the light scanning direction.

17. The invention as set forth in claim 11 above, wherein said display means further includes means providing a high contrast background relative to the light of the scanning beam.

18. The invention as set forth in claim 17 above, wherein said means providing a high contrast background comprises means defining a substantially black background surface relative to the light of the scanning beam.

19. The invention as set forth in claim 18, wherein the display means includes a viewing side and an incidence side, the viewing side comprising a black background and defining an array of pinholes interspersed within the background, the incidence side being disposed opposite the viewing side, and further including a plurality of lenses coupled to the incidence side of the display means, each lens being aligned with a different one of the pinholes and being configured to focus incident light at the pinhole.

20. The invention as set forth in claim 17 above, wherein said means providing a light beam includes laser means for providing light in a single beam having different wavelengths, and wherein said means providing a high contrast background comprises areal optical absorber means disposed at the viewing plane for rejecting wavelengths other than the selected wavelengths.

21. The invention as set forth in claim 11 above, wherein the optical path folding means directs the beam to impinge such that the central axis of the scanning beam envelope is oblique to the display means.

22. The invention as set forth in claim 21, wherein the optical path folding means comprises first mirror means and second mirror means, the first mirror means being positioned to receive light from the scanning means, at an angle of substantially 75° with the path of the light, the second mirror means being oriented at substantially 75° to the first mirror.

23. The invention as set forth in claim 11, wherein the optical path folding means directs the beam to impinge such that the central axis of the envelope of the scanning beam portion that is directed against said display means is substantially orthogonal with respect to the display means.

24. The invention as set forth in claim 23 above, wherein the optical path folding means comprises first mirror means, second mirror means and third mirror means, the first mirror means being disposed in the path of light emanating from the scanning means and at an angle of substantially 88° with respect to the path of light from the scanning means and at an angle of substantially 70° with respect to the display means, the second mirror means being oriented at an angle of substantially 25° to the first mirror means, the third mirror means being oriented at an angle of substantially 70° with respect to the first mirror means.

25. A system for providing an areal color display, with respect to a viewing volume, of video signal information comprising:
    laser means providing a single small diameter beam containing at least two superposed collinear wavelength components of visible light;
    beam modulator means disposed in the path of the laser beam;
    excitation means coupled to the modulator means and responsive to the video signal for modulating the intensity of each of the wavelength components with in excess of 50% transmission efficiency while providing a single transmitted beam of small diameter having collinear modulated wavelength components;
    scanning means disposed in the path of the single transmitted beam for repetitively scanning the small diameter beam to provide a two-dimensional raster within a diverging beam envelope;
    areal optical display means in facing relation to the viewing volume and disposed to intersect the diverging beam envelope;
    and means optically coupled to said display means for redirecting impinging light energy from the scanning beam toward the viewing volume.

26. The invention as set forth in claim 25 above, wherein said display means comprises means differentially redirecting impinging light energy responsive to the instantaneous direction of impingement to define a selected far field radiation pattern for the areal display.

27. The method of generating a large area color television display on a flat display surface comprising the steps of:
    generating a single laser beam containing wavelength components at three different frequencies;
    concurrently modulating the different wavelengths of the beam while maintaining different wavelength components in a single beam;
    scanning the modulated beam through a television raster within a beam envelope;
    expanding the beam envelope by multiple reflection of the beam within an enclosed volume adjacent the flat display surface;
    directing the beam against the flat display surface at an angle such that the beam impinges with substantial nonorthogonality relative to the display surface; and
    redirecting the incident beam energy at the display surface into a predetermined far field radiation pattern.

28. The method as set out in claim 27, wherein the central axis of the beam envelope is substantially non-orthogonal to the plane of the display surface when directed against the display surface.

29. The method as set out in claim 28 including the step of precompensating the beam envelope for raster non-uniformities while expanding the beam envelope.

30. The method as set out in claim 27 above, wherein the step of redirecting the beam energy includes the steps of differentially redirecting different incremental areal portions of the light impinging on the display surface such that the far field radiation pattern is substantially orthogonal to the display surface.

31. The method as set out in claim 30 above, wherein the redirected light is redirected into a far field radiation pattern having substantially wider horizontal than vertical limits.

* * * * *